(12) United States Patent
Smeets et al.

(10) Patent No.: US 10,766,980 B2
(45) Date of Patent: Sep. 8, 2020

(54) PROCESS FOR THE PRODUCTION OF ULTRA HIGH MOLECULAR WEIGHT POLYETHYLENE

(71) Applicant: SABIC GLOBAL TECHNOLOGIES B.V., Bergen Op Zoom (NL)

(72) Inventors: Remy Peter Theresia Smeets, Geleen (NL); Nicolaas Hendrika Friederichs, Geleen (NL); Robert Lap Key Chan, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/344,837

(22) PCT Filed: Oct. 24, 2017

(86) PCT No.: PCT/EP2017/077189
§ 371 (c)(1),
(2) Date: Apr. 25, 2019

(87) PCT Pub. No.: WO2018/077890
PCT Pub. Date: May 3, 2018

(65) Prior Publication Data
US 2019/0248933 A1    Aug. 15, 2019

(30) Foreign Application Priority Data

Oct. 28, 2016   (EP) .................................. 16196164

(51) Int. Cl.
*C08F 110/02* (2006.01)
*C08F 4/655* (2006.01)

(52) U.S. Cl.
CPC .......... *C08F 110/02* (2013.01); *C08F 4/6555* (2013.01); *C08F 2500/01* (2013.01); *C08F 2500/17* (2013.01); *C08F 2500/24* (2013.01)

(58) Field of Classification Search
CPC .............................. C08F 110/02; C08F 4/6555
See application file for complete search history.

(56) References Cited

U.S. PATENT DOCUMENTS

| 4,178,300 A | 12/1979 | Van De Berg |
| 4,617,360 A | 10/1986 | Bienfait |

(Continued)

FOREIGN PATENT DOCUMENTS

| EP | 0159110 A1 | 10/1985 |
| EP | 0523657 A2 | 1/1993 |

(Continued)

OTHER PUBLICATIONS

Berzen et al., "Ultrahigh Molecular Weight Polyethylene (UHMW-PE): Application in Artificial Joints," The British Polymer Journal, vol. 10, Dec. 1978, pp. 281-287.

(Continued)

*Primary Examiner* — Catherine S Branch
(74) *Attorney, Agent, or Firm* — Cantor Colburn LLP

(57) ABSTRACT

The invention relates to a process for the production of ultra high molecular weight polyethylene in the presence of a catalyst system that comprises (I) the solid reaction product obtained from the reaction of a) a hydrocarbon solution containing 1) an organic oxygen containing magnesium compound or a halogen containing magnesium compound and 2) an organic oxygen containing titanium compound and b) an aluminium compound of the formula $AlR_aX_{(3-a)}$ where R is a hydrocarbylgroup containing (3-10) carbon atoms, X is an halogenide and $0<a<3$ and (I!) an aluminium compound having the formula $AlR_3$ in which R is a wherein the molar ratio of aluminium from (b): titanium from (a) is higher than 3:1 and the average particle size of the catalyst ranges between 0.1 μm and 1.0 μm and The obtained polymer is in the form of spheroidal particles with an average particle size of less than 50 μm or is in the form of (Continued)

loosely bound agglomerates consisting of spheroidal subparticles with an average particle size of less than 50 µm.

14 Claims, 1 Drawing Sheet

(56) References Cited

U.S. PATENT DOCUMENTS

| | | |
|---|---|---|
| 6,294,382 B1 | 9/2001 | Rauleder et al. |
| 2011/0159287 A1 | 6/2011 | Friederichs et al. |

FOREIGN PATENT DOCUMENTS

| | | |
|---|---|---|
| EP | 0552260 B1 | 12/1994 |
| EP | 2168988 A1 | 3/2010 |
| WO | 2005021610 A1 | 3/2005 |
| WO | 2016058999 A1 | 4/2016 |

OTHER PUBLICATIONS

European Search Report for European Application No. 16196164.4 dated May 17, 2017, 5 pages.
International Search Report for International Application No. PCT/EP2017/077189, International Filing Date Oct. 24, 2017, dated May 3, 2018, 4 pages.
Journal of Macromolecular Science Part C Polymer Reviews, vol. C42, No. 3, pp. 355-371, 2002.
Written Opinion for International Application No. PCT/EP2017/077189, International Filing Date Oct. 24, 2017, dated May 3, 2018, 5 pages.

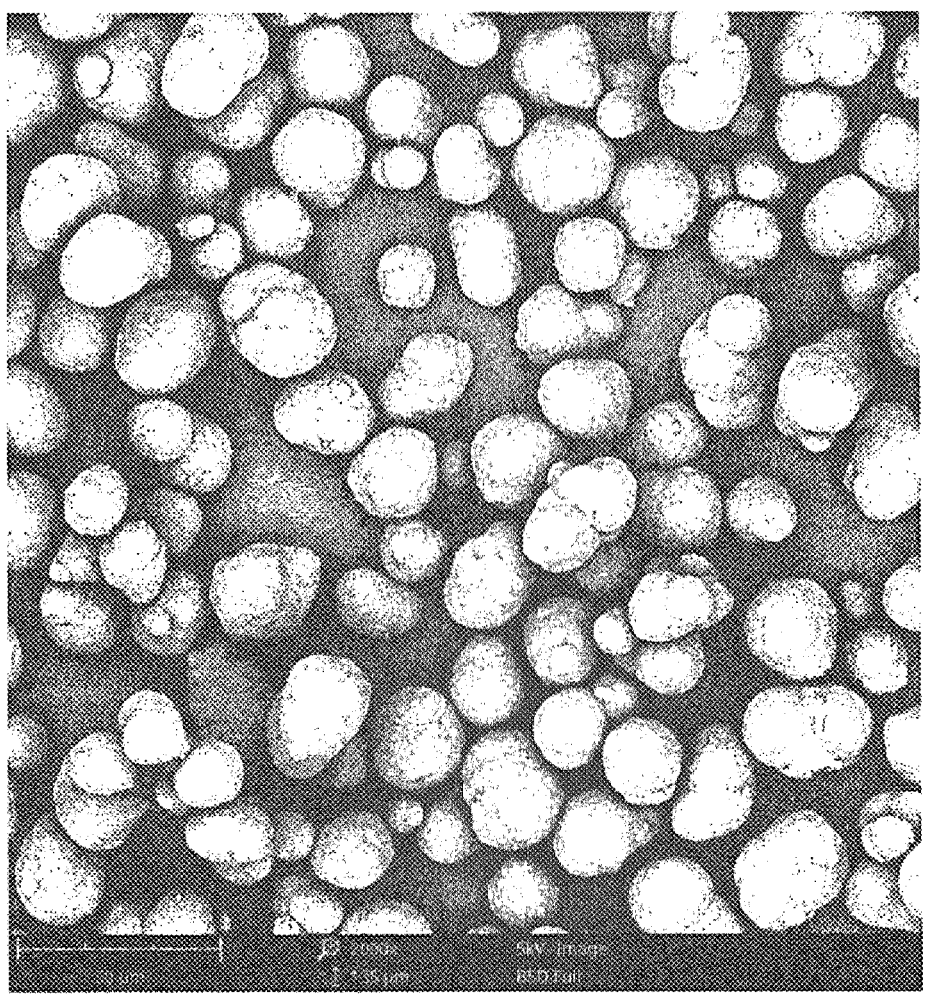

PROCESS FOR THE PRODUCTION OF ULTRA HIGH MOLECULAR WEIGHT POLYETHYLENE

CROSS REFERENCE TO RELATED APPLICATIONS

This application is a 371 of International Application No. PCT/EP2017/077189, filed Oct. 24, 2017, which is incorporated by reference in its entirety, and which claims priority to European Application Serial No. 16196164.4 filed Oct. 28, 2016.

The present invention relates to a process for the production of ultra high molecular weight polyethylene in the presence of a specific catalyst system.

The catalytic production of polyethylene is very well known in the art. A very special class of polyethylene is ultra high molecular weight polyethylene (UHMWPE) with a very high average molecular weight ranging from about 1000000 to well above 6000000 grams/mole whereas high density polyethylene (HDPE) typically has a molar mass between about 50000 and 300000 g/mol. Therefore, these linear polymers have an average molecular weight much higher than that of linear high density polyethylene. The polymer synthesis to obtain UHMWPE is disclosed in Journal of Macromolecular Science Part C Polymer Reviews, Vol. C42, No 3, pp 355-371, 2002. The higher molecular weight gives UHMWPE the unique combination of characteristics making it suitable for applications where lower molecular weight grades fail. The very high molecular weight of this polyethylene results in excellent properties for example a very high abrasion resistance, a very high impact resistance, a very high melt viscosity and a low dynamic coefficient of friction. Because of the high molecular weight and the high melt viscosity specialized processing methods like compression moulding and ram extrusion are applied. Since ultra high molecular weight polyethylene has a high molecular weight and a poor flowability when molten, it is difficult to mould it into a pellet form and the product has to be delivered in a powder form and even more important, it has also to be processed from powder. Consequently, the powder properties heavily determine the production process as well as the converting process.

Generally the average particle size ($D_{50}$) of the polymer is lower than 200 μm The uniformity of the size of the powder particles is indicated by the particle size distribution, commonly known as the "span", defined as $(D_{90}-D_{10})/D_{50}$. For a uniform particle size distribution, this span is preferably lower than 1.

The shape of the polymer powder particles is translated from the shape of the catalyst particles, also known as the replica phenomenon. In general, when this replication takes place, the average particle size of the polymer is proportional to the cube root of the catalyst yield, i.e. the grams of polymer produced per gram of catalyst. (See for example Dall'Occo et al, in "Transition Metals and Organometallics as Catalysts for Olefin Polymerization" Kaminsky, Sinn and Eds. Springer, 1988, page 209-222).

In the case of very specific applications such as for example the use of UHMWPE as additives in rubber, plastic, paints and coatings or as fine filter elements very small powder particle sizes are required, preferably in a spheroidal form. For instance an averaged particle size below 100 μm, preferably below 75 μm, and even more preferably below 50 μm. Due to the aforementioned proportionality between catalyst particle size and catalyst yield, one could produce such small polymer particles by reducing the catalyst yield, but this causes high catalyst residues in the polymer and would also result in high catalyst costs needed to produce the polymer. This puts severe requirements on a catalyst for the production of small polymer powder particles because a high catalyst productivity combined with a polymer particle size below 100 μm, preferably below 50 μm is required. Alternatively, one could produce such small particles by grinding or milling particles of a high average particle size, but due to the high mechanical strength of the UHMwPE particles, these powder particles are difficult to break. In addition, such grinding process would not lead to the desired spheroidal shaped small particles.

It is the object of the present invention to provide an economical process for preparing UHMWPE having an average polymer particle size below 50 μm.

The object is achieved by a process for the production of ultra high molecular weight polyethylene in the presence of a catalyst system that comprises (I) the solid reaction product obtained from the reaction of:
  a) a hydrocarbon solution containing
    1) an organic oxygen containing magnesium compound or a halogen containing magnesium compound and
    2) an organic oxygen containing titanium compound and
  b) an aluminium compound of the formula $AlR_aX_{(3-a)}$ where R is a hydrocarbylgroup containing (3-10) carbon atoms, X is an halogenide and 0<a<3 and (II) aluminium compound having the formula $AlR_3$ in which R is a hydrocarbon radical containing 1-10 carbon atom wherein the molar ratio of aluminium from (b): titanium from (a) is higher than 3:1 and wherein the average particle size of the catalyst ranges between 0.01 μm and 1.0 μm.

According to a preferred embodiment of the invention the obtained polymer is in the form of spheroidal particles with an average particle size of less than 50 μm or is in the form of loosely bound agglomerates consisting of spheroidal sub-particles with an average particle size of less than 50 μm. An example of spheroidal particles is illustrated in FIG. 1.

The term loosely bound together means that in case the obtained polymer particles using the catalyst system according to the invention are in the form of agglomerates of spheroidal shaped sub particles, these agglomerates can be separated into spheroidal shaped particles smaller than 50 μm by using for instance a jet-milling technique.

The process according to the invention with the catalyst according to the invention having the average particle size between 0.01 μm and 1.0 μm results in the production of ultra-high molecular weight polyethylene having a molecular weight between 500000 g/mol and 10000000 g/mol and an average particle size ($D_{50}$) below 50 μm, preferably in the range between 3 μm and 49 μm.

According to a preferred embodiment of the invention the average particle size of the catalyst ranges between 0.05 μm and 0.45 μm.

The hyrocarbyl group of formula $AlR_aX_{(3-a)}$ may be linear or branched.

According to a preferred embodiment of the invention in the aluminium compound of formula $AlR_aX_{(3-a)}$ the halogenide X is chlorine and the hydrocarbylgroup R is a branched ($C_3$-$C_{10}$)alkyl group.

According to another preferred embodiment of the invention in the aluminium compound of the formula $AlR_aX_{(3-a)}$ 1.5≤a≤2.5.

According to a further preferred embodiment of the invention the aluminium compound of formula $AlR_aX_{(3-a)}$ is selected from di-isobutyl aluminium chloride (DIBAC), isobutyl-aluminium-dichloride (IBADIC) and mixtures thereof.

According to a more preferred embodiment of the invention the aluminium compound of formula $AlR_aX_{(3-a)}$ is di-isobutyl aluminium chloride (DIBAC).

According to another preferred embodiment the invention relates to a process for the production of ultra-high molecular weight polyethylene in the presence of a catalyst system that comprises (I) the solid reaction product obtained from the reaction of
a) a hydrocarbon solution containing
1) an organic oxygen containing magnesium compound or a halogen containing magnesium compound and
2) an organic oxygen containing titanium compound and
b) di-isobutyl aluminium chloride and
(II) an aluminium compound having the formula $AlR_3$ in which R is a hydrocarbon radical containing 1-10 carbon atom wherein the molar ratio of aluminium from (b): titanium from (a) is higher than 3:1 and wherein the average particle size of the catalyst ranges between 0.01 µm and 1.0 µm.

The hydrocarbon solution I (a) is a clear hydrocarbon solution, visually free of solid particles. The hydrocarbon solution comprising the organic oxygen containing magnesium compound and the organic oxygen containing titanium compound is a clear liquid, because the presence of any solid particles in the starting compounds can undesirably influence the size and shape of the subsequent catalyst particles.

Preferably the molar ratio of aluminium from (b): titanium from (a) ratio is higher than 5:1.

Preferably the molar ratio of aluminium from (b): titanium from (a) ratio is lower than 20:1.

In a preferred embodiment of the invention the molar ratio of magnesium:titanium is lower than 4:1.

Preferably the molar ratio magnesium:titanium ranges between 0.2:1 and 3:1.

Preferably the molar ratio of aluminium from (II): titanium from (a) ranges between 1:1 and 300:1

More preferably the molar ratio of aluminium from (II): titanium from (a) ranges between 3:1 and 100:1.

Generally the span of the particle size distribution of the catalyst is higher than 0.8.

The aluminium compound having the formula $AlR_3$ in which R is a hydrocarbon radical containing 1-10 carbon atom is dosed prior to or during the polymerization and may be referred to as a cocatalyst.

Suitable organic oxygen containing magnesium compounds include for example alkoxides such as magnesium methylate, magnesium ethylate and magnesium isopropylate and alkylalkoxides such as magnesium ethylethylate.

According to a preferred embodiment of the invention the organic oxygen containing magnesium compound is a magnesium alkoxide Preferably the magnesium alkoxide is magnesium ethoxide $Mg(OC_2H_5)_2$.

Suitable halogen containing magnesium compounds include for example magnesium dihalides and magnesium dihalide complexes wherein the halide is preferably chlorine.

Suitable organic oxygen containing titanium compound may be represented by general formula $[TiO_x(OR)_{4-2x}]_n$ in which R represents an organic radical, x ranges between 0 and 1 and n ranges between 1 and 6.

Suitable examples of organic oxygen containing titanium compounds include alkoxides, phenoxides, oxyalkoxides, condensed alkoxides, carboxylates and enolates.

According to a preferred embodiment of the invention the organic oxygen containing titanium compounds is a titanium alkoxide.

Suitable alkoxides include for example $Ti(OC_2H_5)_4$, $Ti(OC_3H_7)_4$, $Ti(OC_4H_9)_4$, $Ti(OC_8H_{17})_4$ and $Ti(OC_8H_{15})_4$.

According to a preferred embodiment of the invention the organic oxygen containing titanium compound is $Ti(OC_3H_7)_4$, $Ti(OC_4H_9)_4$ or $Ti(OC_8H_{15})_4$. Suitable examples of the cocatalyst of the formula $AlR_3$ include tri ethyl aluminium, tri isobutyl aluminium, tri-n-hexyl aluminium and tri octyl aluminium. Preferably the aluminum compound in (II) is tri ethylaluminium or tri isobutyl aluminium.

Preferably, the preparation of the solid reaction product of the catalyst does not comprise a silicon containing compound.

The hydrocarbon solution of organic oxygen containing magnesium compound and organic oxygen containing titanium compound can be prepared according to procedures as disclosed for example in U.S. Pat. No. 4,178,300 and EP0876318. The solutions are in general clear liquids. In case there are any solid particles, these can be removed via filtration prior to the use of the clear solution in the catalyst synthesis.

The catalyst of the present invention may be obtained for example by a first reaction between a magnesium alkoxide and a titanium alkoxide, followed by dilution with a hydrocarbon solvent, resulting in a soluble complex consisting of a magnesium alkoxide and a titanium alkoxide and thereafter a reaction between a hydrocarbon solution of said complex and an aluminium compound of the formula $AlR_3X_{(3-a)}$.

Preferably, the aluminium compound of formula $AlR_aX_{(3-a)}$ is used as a solution in a hydrocarbon. Any hydrocarbon that does not react with this aluminium compound is suitable to be applied as the hydrocarbon. Preferred hydrocarbons are aliphatic hydrocarbons for example pentane, hexane, cyclohexane and heptane.

The sequence of the addition can be either adding the hydrocarbon solution containing the organic oxygen containing magnesium compound and organic oxygen containing titanium compound to the aluminium compound of the formula $AlR_aX_{(3-a)}$ or the reversed.

In the reaction of the hydrocarbon solution of the organic oxygen containing magnesium compound and the organic oxygen containing titanium compound with the aluminium compound of the formula $AlR_aX_{(3-a)}$ a solid precipitates. The temperature for this reaction can be any temperature below the ambient boiling point of the used hydrocarbon, for example between 10 and 70 degrees Celsius. After the precipitation reaction the resulting mixture can be heated for a certain period of time to finish the reaction. After the reaction the precipitate is filtered and washed with a hydrocarbon. Other means of separation of the solids from the diluents and subsequent washings can also be applied, like for example multiple decantation steps. All steps should be performed in an inert atmosphere of nitrogen or another suitable inert gas.

The polymerization reaction may be performed in the gas phase or in bulk in the absence of an organic solvent, or carried out in liquid slurry in the presence of an organic diluent. The polymerization can be carried out batch-wise or in a continuous mode. These reactions are performed in the absence of oxygen, water, or any other compounds that may act as a catalyst poison. Suitable solvents include for example alkanes and cycloalkanes for example pentane, hexane, heptane, n-octane, iso-octane, cyclohexane, and methylcyclohexane; alkylaromatics such as toluene, xylene, ethylbenzene, isopropylbenzene, ethyltoluene, n-propylbenzene and diethyl benzene. The polymerization temperature may range between 20° C. and 200° C. and is preferably lower than 120° C. The pressure of a monomer during polymerization is adequately above 0.05 bar and more preferably below 40 bars. (1 bar=100000 Pa)

The polymerization can be carried out in the presence of so-called anti-static agent or anti fouling agent, in an amount ranging from 1 to 500 ppm related to the total reactor contents.

As is well known in the art, so-called external donors may be applied during the polymerization in order to further modify the catalyst performance if this is desired. Suitable external donors are organic compounds containing hetero atoms which have at least one lone pair of electrons available for coordination to the catalyst components or aluminium alkyls. Suitable examples of external donors include alcohols, ethers, esters, alkoxy-silanes and amines.

The molecular mass of the polymer may be controlled by any means as known in the art, for example by adjustment of the polymerization temperature or by the addition of molecular weight control agents like for example hydrogen or diethyl zinc.

Due to the very high molecular weight of UHMWPE, it is difficult to analyze its molar mass by for instance Gel Permeation Chromatography (GPC). Also the application of methods based on melt-viscosity is not straightforward.

For instance, at molecular weights above 1000000 g/mol, the determination of the melt-index according to ASTM D-1238 becomes difficult. Even at high loadings of 21.6 kg, the melt index of UHMWPE drops to values below 0.1 dg/min, even below 0.02 dg/min. Berzen et al. disclose at page 281 in The British Polymer Journal, Vol. 10, December 1978 that with ultrahigh molecular weight polyethylene the melt flow cannot be determined as a stationary flow does not occur.

A more suitable technique is based on the so called Elongational Stress, sometimes also referred to as "Flow Value". The Elongational Stress can be determined according to DIN 53493. This Elongational Stress can subsequently be translated into the molecular weight as disclosed for example by J. Berzen et al. in The British Polymer Journal, Vol. 10, December 1978, pp 281-287.

Another suitable technique is based on the intrinsic viscosity measurement, which can be determined according to ISO1628-3.

UHMWPE powder obtained with the process according to the invention may contain agglomerates of loosely bound spheroidal shaped sub-particles that when treated in suitable milling technique are broken down to the spheroidal shaped sub-particles of the agglomerates. This treatment results in spheroidal powder particles of an average particle size below 50 µm. Preferably, the amount of larger particles, containing not loosely bound agglomerates that cannot be broken down by a milling technique is less than 20 percent of the total amount of polymer, more preferably less than 10 percent A suitable milling technique is for instance a jet-milling technique, like the jet-mills as supplied by the company Hosokawa.

UHMWPE obtained with the process according to the invention can be applied in very different areas such as for example the use of UHMWPE as additives in rubber, plastic, paints and coatings or as fine filter elements.

EP0159110 discloses a process to obtain small diameter catalyst particles by subjecting a Ziegler-type catalyst suspension to an elaborate high speed shearing treatment and subsequently removing those catalyst particles that are too large in diameter. The Ziegler type catalyst is prepared by strictly adjusting the condition of deposition at the time of depositing a solid product that is being formed by bringing a liquid magnesium compound into contact with a liquid titanium compound. Alternatively, EP0159110 discloses a process for obtaining small sized polymer particles by applying a high speed shearing treatment of a polyolefin powder slurry to break down polymer particles that are obtained with the specific Ziegler type catalyst as disclosed in this patent.

EP2168988 discloses a process to obtain small UHMWPE particles. The applied Ziegler Natta catalyst is prepared via a multi-step procedure applying very strong cooling at −20° C. and multiple treatments with ethylbenzoate and titanium tetrachloride. The obtained specific catalyst has an average particle size of 1 µm and results in relatively high catalyst residues when producing small powder particles.

EP0523657 discloses a solid catalyst component prepared from a liquid magnesium-titanium compound and a compound capable of exchanging an —OR group with a halogen atom. This solid catalyst component has to meet special porosity properties and is claimed to result in polymer powder particles below 150 µm if used under specifically described polymerization conditions. EP0523657 does not teach how spheroidal shaped polymer particles with an average particle size below 50 µm can be obtained.

US2011159287 discloses a process for the production of ultra-high molecular weight polyethylene with an average particle size in the range of 50-250 µm, prepared using a catalyst containing the solid reaction product obtained from the reaction of:

a) a hydrocarbon solution containing
1) an organic oxygen containing magnesium compound or a halogen containing magnesium compound and
2) an organic oxygen containing titanium compound and
b) an aluminium halogenide having the formula $Al_nX_{3-n}$ in which R is a hydrocarbon radical containing 1-10 carbon atoms, X is halogen and 0<n<3.

US2011159287 discloses the production of irregular shaped polymer particles, which is the opposite of the desired spheroidal shaped polymer particles according to the present invention.

U.S. Pat. No. 4,617,360 discloses a process for ethylene polymerisation in which a solid catalyst component is prepared from an organic oxygen containing magnesium compound, and organic oxygen containing titanium compound and an aluminium compound of the formula $AlR_nC_{(3-n)}$ in which n=1. U.S. Pat. No. 4,617,360 teaches that IBADIC $(Al(iC_4H_9)Cl_2)$ results in an increased particle size of the polymer whereas the process according to the present invention results in smaller particle sized ultra-high molecular weight polyethylene. U.S. Pat. No. 4,617,360 does not disclose the production of ultra-high molecular weight polyethylene.

WO2005021610 describes the reaction of a liquid Mg/Ti compound with an electron donor. In this step an intermediate solid complex is produced with particle size between 14.1 and 16.6 micron. This solid is subsequently treated with a halogen containing aluminum compound which results in an even further increase of the particle size of the resulting catalytic solid. This is in contrast to the present invention wherein a solid reaction product by combining a solution of the Mg/Ti compound with an aluminum compound is formed. WO2005021610 does not disclose the production of ultra-high molecular weight polyethylene.

The invention will be elucidated by means of the following non-restrictive examples.

EXAMPLES

The poured bulk density of the ultra-high molecular weight polyethylene polymer powder is determined by measuring the bulk density of the polymer powder according to the procedure outlined in ASTM D1895/A.

The average particle size ($D_{50}$) of the catalyst was determined by the so called laser light scattering method in hexanes diluent using a Malvern Mastersizer equipment. The average particle size and particle size distribution ("span") of the polymer powders were determined by laser light scattering method using a Beckman Coulter equipment.

The intrinsic viscosity is determined according to ISO1628-3.

The polymer powders are treated with a Hosokawa 100 AFG jet-mill during 30 minutes. In such a jet-mill, the loosely bound agglomerates are broken down to the individual sub-particles. By adjusting the rotation-speed of the classifier wheel, the polymer particles are screened according to their average particle size. Increasing the rotation speed of the classifier wheel results in a smaller average particle size of particles that can pass this classifier wheel. Polymer particles that are too large to pass the classifier wheel or are in the form of not loosely bound agglomerates, remain in the jet-mill.

Example I

Preparation of a hydrocarbon Solution Comprising $Mg(OC_2H_5)_2$ and $Ti(OC_4H_9)_4$ 92 grams of granular $Mg(OC_2H_5)_2$ and 138 millilitres of $Ti(OC_4H_9)_4$ were brought in a 2 litre round bottomed flask equipped with a reflux condensor and stirrer. While gently stirring, the mixture was heated to 180° C. and subsequently stirred for 1.5 hours. During this, a clear liquid was obtained. The mixture was cooled down to 120° C. and subsequently diluted with 518 ml of hexane. Upon addition of the hexane, the mixture cooled further down to 67° C. The mixture was kept at this temperature for 2 hours and subsequently cooled down to room temperature. The resulting clear solution was stored under nitrogen atmosphere and was used as obtained. Analyses on the solution showed a titanium concentration of 0.55 mol/l.

Example II

Preparation of a Hydrocarbon Solution Comprising $Mg(OC_2H_5)_2$ and $Ti(OC_8H_{17})_4$ 112 grams of granular $Mg(OC_2H_5)_2$ and 200 millilitres of $Ti(OC_8H_{17})_4$ were transferred to a 2 litre round bottomed flask equipped with a reflux condenser and stirrer. While gently stirring, the mixture was heated to 180° C. and subsequently stirred for 2 hours. During this, a clear liquid was obtained. The mixture was cooled down to 120° C. and subsequently diluted with 1186 grams of hexanes. Upon addition of the hexane, the mixture cooled further down to 67° C. The mixture was kept at this temperature for 2 hours and subsequently cooled down to room temperature. The resulting clear solution was stored under nitrogen atmosphere and was used as obtained. Analyses on the solution showed a titanium concentration of 0.34 mol/l.

Example III

Preparation of the Catalyst

In a 0.8 liters glass reactor, equipped with baffles, reflux condenser and stirrer, 180 ml hexanes and 136 ml of the complex from Example I (80 mmol Ti) was dosed. The stirrer was set at 1400 RPM. Via a peristaltic pump, 250 ml of a diisobutyl aluminium chloride (DiBAC) solution (150 ml DiBAC+100 ml hexanes) were dosed in 2 hours time. The aluminium to titanium molar ratio was 10.7. Subsequently, the mixture was refluxed for 2 hours. After cooling down to ambient temperature, the obtained red/brown suspension was washed 5 times with 500 ml hexanes via decantation. Finally, the solids were taken up in 500 ml of hexanes and the resulting slurry was stored under nitrogen. The average particle size of the catalyst is 0.18 μm

Example IV

Preparation of the Catalyst

In a 0.8 liters glass reactor, equipped with baffles, reflux condenser and stirrer, 271 ml hexanes and 99 ml of the complex from Example II (17 mmol Ti) was dosed. The stirrer was set to 1200 RPM. Via a peristaltic pump, 200 ml of a diisobutyl aluminium chloride (DiBAC) solution (160 ml DiBAC+40 ml hexanes) were dosed in 1 hour. The aluminium to titanium molar ratio was 14. Subsequently, the mixture was refluxed for 2 hours. After cooling down to ambient temperature, the obtained black suspension was washed 5 times with 500 ml hexanes via decantation. Finally, the solids were taken up in 500 ml of hexanes and the resulting slurry was stored under nitrogen. The average particle size of the catalyst is 0.12 μm

Example V

Polymerization

The polymerization was carried out in a 10 litres autoclave using 5 litres purified hexanes as a diluent. 4 mmols of tri-isobutylaluminum were added to the 5 litres purified hexanes. The mixture was heated to 60° C. and pressurized with 1 bars ethylene. Subsequently a slurry containing 20 mg of the catalyst obtained in Example III was dosed. The temperature was maintained at 60° C. and the pressure was kept constant by feeding ethylene. The reaction was stopped after 120 minutes. Stopping was performed by de-pressurizing and cooling down the reactor. The reactor contents were passed through a filter; the wet polymer powder was collected and subsequently dried.

An amount of 366 grams of UHMWPE powder was produced. The powder was treated with a Hosokawa 100 AFG jet mill during 30 minutes, setting the rotation-speed of classifier wheel at 4000 RPM.

After this treatment the polymer powder that passed the classifier wheel had an average particle size of 23.3 μm. The yield of polymer passing the classifier wheel at 4000 RPM was 85% by weight.

Examples VI-XIII

Example V was repeated by adjusting the conditions as indicated in the overview of polymerization results as listed in Table 1.
The results of jet mill treatments are summarised in Table 2.

Comparative Example A

Preparation of the Catalyst.

In a 0.8 liters glass reactor, equipped with baffles, reflux condenser and stirrer, 200 ml hexanes and 140 ml of the complex from Example I (80 mmol Ti) was dosed. The stirrer was set at 1400 RPM. Via a peristaltic pump, 206 ml of diethyl aluminium chloride (DEAC) solution (106 ml DEAC+100 ml hexanes) were dosed in 2 hours' time. Aluminium to titanium ratio is 10.7. Subsequently, the mixture was refluxed for 2 hours. After cooling down to ambient temperature, the obtained red/brown suspension was transferred to a glass filter and the solids were separated. The solids were washed 3 times with 500 ml hexanes. Finally, the solids were taken up in 500 ml of hexanes and the resulting slurry was stored under nitrogen. The average particle size is 5.2 μm.

Comparative Example B

Preparation of the Catalyst

In a 0.8 liters glass reactor, equipped with baffles, reflux condenser and stirrer, 200 ml hexanes and 140 ml of the complex from Example I (80 mmol Ti) was dosed. The stirrer was set at 1400 RPM. Via a peristaltic pump, 200 ml of ethyl aluminium dichloride (EADC) solution (126 ml 50 wt % EADC+74 ml hexanes) were dosed in 2 hours' time. Aluminium to titanium ratio of 5.4. Subsequently, the mixture was refluxed for 2 hours. After cooling down to ambient temperature, the obtained red/brown suspension was transferred to a glass filter and the solids were separated. The solids were washed 3 times with 500 ml hexanes. Finally, the solids were taken up in 500 ml of hexanes and the resulting slurry was stored under nitrogen. The average particle size is 8.1 μm.

Comparative Example C

Preparation of the Catalyst

In a 0.8 liters glass reactor, equipped with baffles, reflux condenser and stirrer, 100 ml hexanes and 70 ml of the complex from Example I (40 mmol Ti) was dosed. The stirrer was set at 1400 RPM. Via a peristaltic pump, 166 ml of ethyl aluminium dichloride (EADC) solution (126 ml 50 wt % EADC+40 ml hexanes) were dosed in 2 hours' time. Aluminium to titanium ratio was 10.8. Subsequently, the mixture was refluxed for 2 hours. After cooling down to ambient temperature, the obtained red/brown suspension was transferred to a glass filter and the solids were separated. The solids were washed 3 times with 500 ml hexanes. Finally, the solids were taken up in 500 ml of hexanes and the resulting slurry was stored under nitrogen. The average particle size is 7.3 μm.

Comparative Example D

Preparation of the Catalyst

In a 0.8 liters glass reactor, equipped with baffles, reflux condenser and stirrer, 271 ml hexanes and 99 ml of the complex from Example II (17 mmol Ti) was dosed. The stirrer was set at 1600 RPM. Via a peristaltic pump, 200 ml of ethyl aluminium dichloride (EADC) solution (37 ml 50 wt % EADC+163 ml hexanes) were dosed in 1 hours' time. Aluminium to titanium ratio was 8.5. Subsequently, the mixture was refluxed for 2 hours. After cooling down to ambient temperature, the obtained red/brown suspension was transferred to a glass filter and the solids were separated. The solids were washed 3 times with 500 ml hexanes. Finally, the solids were taken up in 500 ml of hexanes and the resulting slurry was stored under nitrogen. The average particle size is 8.8 μm.

The comparative examples A-D result in average particle sizes of the catalysts of 5.2, 8.1, 7.3 and 8.8 μm respectively, which is far above the average particle size of the catalyst according to the invention ranging between 0.01 μm and 1.0 μm

TABLE 1

| | Catalyst according to Example | Cat amount mg | Temp ° C. | Partial ethylene pressure bar | time (min) | Polymer Yield g | Catalyst Yield Kg/g | Intrinsic viscosity dl/g |
|---|---|---|---|---|---|---|---|---|
| Example V | Example III | 20 | 60 | 1 | 120 | 366 | 18.3 | 21.0 |
| Example VI | Example III | 30 | 60 | 1 | 126 | 1025 | 34.2 | 20.4 |
| Example VII | Example III | 100 | 60 | 0.34 | 247 | 1000 | 10.0 | 17.9 |
| Example VIII | Example III | 30 | 60 | 0.5 | 475 | 1048 | 34.9 | 19.8 |
| Example IX | Example III | 0.5 | 60 | 10 | 135 | 261 | 522.0 | 17.7 |
| Example X | Example III | 200 | 60 | 0.34 | 177 | 1014 | 5.1 | 16.1 |
| Example XI | Example IV | 100 | 60 | 0.34 | 492 | 1002 | 10.0 | 20.4 |
| Example XII | Example III | 200 | 75 | 0.34 | 210 | 1074 | 5.4 | 13.5 |
| Example XIII | Example IV | 200 | 60 | 0.34 | 351 | 1002 | 5.0 | 13.1 |

TABLE 2

| Polymer from example: | Rotation speed of classifier wheel RPM | Yield of polymer passing the classifier wheel % | $D_{50}$ of the polymer that passed the classifier wheel μm |
|---|---|---|---|
| Example V | 4000 | 85 | 23.3 |
| Example VI | 4000 | 85 | 24.9 |
| Example VII | 4000 | 85 | 20.8 |
| Example VII | 6000 | 86 | 14.6 |
| Example VIII | 4000 | 93 | 24.4 |
| Example X | 4000 | 99 | 26.3 |
| Example X | 6000 | 95 | 15.1 |
| Example X | 8000 | 80 | 11.2 |
| Example XI | 4000 | 99 | 20.6 |
| Example XI | 6000 | 80 | 13.4 |
| Example XII | 4000 | 80 | 26.5 |

TABLE 2-continued

| Polymer from example: | Rotation speed of classifier wheel RPM | Yield of polymer passing the classifier wheel % | $D_{50}$ of the polymer that passed the classifier wheel µm |
|---|---|---|---|
| Example XII | 8000 | 65 | 11.4 |
| Example XIII | 4000 | 99 | 16.8 |
| Example XIII | 6000 | 99 | 15.5 |

FIG. 1 illustrates the spheroidal shape of the obtained polymer particles from Example VII at a rotation speed of the classifier wheel of 6000 rpm.

The invention claimed is:

1. A process for the production of ultra high molecular weight polyethylene, the process comprising polymerizing ethylene in the presence of a catalyst system that comprises:
(I) a catalyst which is a solid reaction product obtained from the reaction of:
a) a hydrocarbon solution containing
1) an organic oxygen containing magnesium compound or a halogen containing magnesium compound, and
2) an organic oxygen containing titanium compound and
b) an aluminium compound of the formula $AlR_aX_{(3-a)}$ where R is a hydrocarbyl group containing 3-10 carbon atoms, X is an halogenide, and 0<a<3, and
(II) aluminium compound having the formula $AlR_3$ in which R is a hydrocarbon radical containing 1-10 carbon atom, wherein
the molar ratio of aluminium from (b): titanium from (a) is higher than 3:1, and the average particle size of the catalyst ranges between 0.01 µm and 1.0 µm.

2. The process according to claim 1, characterised in that the obtained polymer is in the form of spheroidal particles with an average particle size of less than 50 µm or is in the form of loosely bound agglomerates consisting of spheroidal sub-particles with an average particle size of less than 50 µm.

3. The process according to claim 1, characterised in that in the aluminium compound of formula $AlR_aX_{(3-a)}$ X is chlorine and R is a branched ($C_3$-$C_{10}$) alkyl group.

4. The process according to claim 1, characterised in that the aluminium compound of formula $AlR_aX_{(3-a)}$ is selected from di-isobutyl aluminium chloride (DIBAC), isobutyl-aluminium-dichloride (IBADIC) and mixtures thereof.

5. The process according to claim 1, characterised in that in the aluminium compound of the formula $AlR_aX_{(3-a)}$ 1.5≤a≤2.5.

6. The process according to claim 4, characterised in that the aluminium compound of formula $AlR_aX_{(3-a)}$ is di-isobutyl aluminium chloride (DIBAC).

7. The process according to claim 1, characterised in that the organic oxygen containing magnesium compound is magnesium alkoxide.

8. The process according to claim 1, characterised in that the organic oxygen containing titanium compound is titanium alkoxide.

9. The process according to claim 8 characterised in that the titanium alkoxide is $Ti(OC_4H_9)_4$ or $Ti(OC_8H_{15})_4$.

10. The process according to claim 1, characterised in that the the aluminium compound having the formula $AlR_3$ is triethylaluminium or triisobutyl aluminium.

11. The process according to claim 1, characterised in that the molar ratio of magnesium: titanium is lower than 3:1.

12. The process according to claim 1, characterised in that the average particle size of the catalyst ranges between 0.05 µm and 0.45 µm.

13. The process according to claim 1, characterised in that in the aluminium compound of formula $AlR_aX_{(3-a)}$ X is chlorine and hydrocarbylgroup R is a branched ($C_3$-$C_{10}$) alkyl group, that in the aluminium compound of the formula $AlR_aX_{(3-a)}$ 1.5≤a≤2.5, and that the organic oxygen containing titanium compound is $Ti(OC_4H_9)_4$ or $Ti(OC_8H_{15})_4$, and that the average particle size of the catalyst ranges between 0.05 µm and 0.45 µm.

14. The process according to claim 1, characterised in that the aluminium compound of formula $AlR_aX_{(3-a)}$ is selected from di-isobutyl aluminium chloride (DIBAC), isobutyl-aluminium-dichloride (IBADIC) and mixtures thereof, that in the aluminium compound of the formula $AlR_aX_{(3-a)}$ 1.5≤a≤2.5, that the organic oxygen containing titanium compound is $Ti(OC_4H_9)_4$ or $Ti(OC_8H_{15})_4$, and that the average particle size of the catalyst ranges between 0.05 µm and 0.45 µm.

* * * * *